United States Patent Office 3,634,366
Patented Jan. 11, 1972

3,634,366
POLYMERIZING METHOD
Kiyoshi Chujo, Kazunobu Tanaka, and Keiichi Ohata, Saitama, Japan, assignors to Daicel Ltd., Higashi-ku, Osaka, Japan
No Drawing. Filed May 23, 1969, Ser. No. 827,169
Claims priority, application Japan, May 23, 1968, 43/34,989
Int. Cl. C08f *1/00, 15/02, 19/00*
U.S. Cl. 260—78.5
9 Claims

ABSTRACT OF THE DISCLOSURE

A polymerizing method in which (1) a monomer comprising a polymerizable $\alpha,\beta$-unsaturated aliphatic monobasic or dibasic acid and (2) a monomer having an amine group which can form a quaternary ammonium salt, are contacted and mixed with each other under polymerizing conditions in order to form a polymer which is useful as a flocculating agent, a soil conditioner, a dispersing agent, an ion exchange agent, a paper sizing agent, a textile sizing agent and a binder or adhesive.

BACKGROUND OF THE INVENTION

Field of the invention

This invention relates to a new polymerizing method characterized by contacting and mixing with each other a monomer having a carboxyl group and a monomer having an amine group which can form a quaternary ammonium salt.

Description of the prior art

It is a known fact that a monomer containing a carboxyl group, for example, acrylic acid or methacrylic acid, can be polymerized by itself or copolymerized with any other vinyl monomer by heat or an initiator. It is also a known fact that a monomer having an amine group which can become a quaternary ammonium salt, for example, 2-vinylpyridine or dimethylaminoethyl methacrylate, can be polymerized by itself or copolymerized with any other vinyl monomer by heat or an initiator. The inventors have investigated, over a wide range, the polymerizing reactivity of monomers having such functional groups and have made the present invention.

It has recently been reported that 4-vinylpyridine causes a natural spontaneous polymerization with a special ionic mechanism. That is to say, V. A. Kabanov et al. have reported that, when 4-vinylpyridine is made to react with an alkyl halide, no quaternary ammonium salt of the monomer will be obtained, but rather, an amorphous polymer will be obtained (J. Polymer Sci., C. No. 16, 1079 (1967)). It is also described in the same report that 4-vinylpyridine spontaneously polymerizes in the presence of a polystyrene sulfonic acid. However, this is explained to be because the 4-vinylpyridine monomer is chemically activated by being coordinated on the matrix of the polystyrene sulfonic acid and the polymerization of the 4-vinylpyridine occurs along the matrix. Further, it is also explained that the mechanism of such polymerization is anion polymerization.

SUMMARY OF THE INVENTION

The present inventors have discovered that when (1) a monomer having a carboxyl group and (2) a monomer having an amine group which can become a quaternary ammonium salt, are contacted and mixed with each other, a spontaneous polymerization will occur. From the facts that (1) this polymerizing reaction will completely stop when hydroquinone is added, (2) the polymerization proceeds smoothly even in a carbon dioxide atmosphere and (3) the reaction is inhibited in air, the polymerizing mechanism must be considered to be radical chain polymerization and to be quite different from the polymerizing mechanism referred to in the above mentioned report. Further, when both kinds of monomers are contacted and mixed with each other, generally heat will be generated. However, after the end of the heat generation, the polymerizing reaction will proceed in some cases. Even if the heat generation is controlled by using solution polymerization, the polymerization will proceed smoothly. Therefore, it is evident that it is not a polymerization initiated merely by heat. Further, as no homopolymer of either monomer can be separated from the produced polymer, it is presumed that the produced polymer is probably a copolymer. It is evident from the above facts that the polymerizing method discovered by the inventors is novel.

As monomers having a carboxyl group which can be used in the present invention, there are enumerated acrylic acid, methacrylic acid, crotonic acid, itaconic acid, maleic acid, fumaric acid, maleic anhydride (which contains no free carboxyl group but is within the scope of the present invention), cinnamic acid and sorbic acid. Acrylic acid and methacrylic acid are preferred. However, it is an important feature of the invention that crotonic acid, itaconic acid, maleic acid, fumaric acid, maleic anhydride and sorbic acid, which are considered to be hard to homopolymerize, can easily become part of the polymer produced in the polymerizing method of the present invention. As monomers having an amine group which can become a quaternary ammonium salt and which can be used in the present invention, there are enumerated 2-vinylpyridine, 4-vinylpyridine, 2-methyl-5-vinylpyridine, dimethylaminomethyl methacrylate, dimethylaminoethyl methacrylate and 1-vinyl-2-methylimidazole. N-vinylcarbazole, N-vinylpyrrolidone and acrylamide have no amine group which can form a quaternary ammonium salt and therefore, cannot be used in the present invention. Dimethylaminomethyl methacrylate and dimethylaminoethyl methacrylate are preferred as the amine group containing monomers for the purposes of this invention.

It is also an important feature of the invention that no polymerization initiator is required at all in the polymerizing method of the present invention. Bulk polymerization of both kinds of monomers is possible, but solution polymerization in a solvent such as methanol is also possible. In the case of bulk polymerization, unless the reaction is stopped before completion, the produced polymer will have a cross-linked structure in some cases. But if solution polymerization is employed, a soluble straight chain polymer can be easily made. The polymerizing temperature is not particularly critical, but a temperature in the range of 0 to 150° C. can be used. A polymerizing temperature in the range of about 20–80° C. is preferred. The time required for the polymerization remarkably depends on the particular combination of the two kinds of monomers used. In some cases the polymerization may start immediately after mixing and contacting both kinds of monomer and, in other cases or may occur gradually over a long time. The time for the polymerization reaction preferably is in the range of about 1–10 hours. Further, in most cases, a small amount of bubbles will be produced during the course of the reaction. It is therefore presumed that some elimination reaction occurs simultaneously with the addition polymerization reaction. The mixing ratio of both kinds of monomers is not particularly critical. The polymerization reaction can be effectively carried out if the mol ratio of the monomer having carboxyl group to the monomer having amine group is from about 0.5–1.5/1, with the preferred range being about 0.8–1.2/1 and the best results are achieved at a ratio of about 1/1.

As described above, the polymerizing method according to the present invention is remarkably different in many points from any known conventional polymerizing method. Though its mechanism is not clear, it is thought that an entirely new kind of polymerizing reaction occurs.

Depending on the particular combination of the two kinds of monomers used, the produced polymer varies from a sticky viscous substance to a hard plastic substance. Its color also varies from a thick brown color to substantially colorless and transparent. Any polymer produced according to the invention, in which no cross-linking reaction has occurred, is soluble in water and methanol. It is presumed that, in water, it has a polyelectrolyte structure, such as is shown by the following formula. In the following formula, for example, acrylic acid is selected as the monomer having a carboxyl group and dimethylaminoethyl methacrylate is selected as the monomer having an amine group which can become a quaternary ammonium salt.

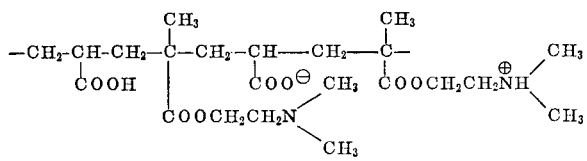

As it has such a polyelectrolyte property, its aqueous solution is very stable even over a wide pH range and it has a very effective accelerating effect in the settling action of soils (flocculating agent) over a wide pH range as shown in the example.

The polymer synthesized by the present invention is suitable for a wide variety of uses, such as a flocculating agent, a soil conditioner agent, a dispersing agent, an ion exchange resin, a paper sizing agent, a textile sizing agent and binder or adhesive by utilizing such special structure as is mentioned above.

The invention is further described with reference to the following illustrative examples. However, it will be understood that these examples are given to further explain the present invention and the invention is not limited to the details of these examples.

Example 1

A glass ampoule of a capacity of about 50 ml. was kept at −78° C. 7.20 g. of acrylic acid and 15.70 g. of dimethylaminoethyl methacrylate were put into the ampoule, the atmosphere in the ampoule was replaced with nitrogen and then the ampoule was sealed. The ampoule was dipped in a thermostatic tank at 30° C. and polymerization was carried out while lightly shaking the ampoule. In 1, 5 and 24 hours after the start of the reaction, the ampoule was taken out and was opened to take out the produced polymer. The remaining monomers were driven out at about 80° C. under a reduced pressure and the amount of the produced polymer was weighed to calculate the conversion polymer yield. The results were as listed in the following table.

| Polymeri- | Conver- | Polymer | | |
| zation time (in hours) | sion (in percent) | State | Color | Solubility in methanol |
| --- | --- | --- | --- | --- |
| 1 | About 40 | Viscous | Colorless and white turbid. | Soluble. |
| 5 | About 100 | Hard | do | Swelled remarkably. |
| 24 | do | do | (1) | Swelled. |

[1] Colorless and white turbid and became transparent when the methanol swollen substance was dried.

The polymer obtained in 24 hours after the start of the polymerization was extracted with methanol, was soaked overnight in concentrated hydrochloric acid, was then well water-washed to perfectly remove the homopolymer part of the dimethylaminoethyl methacrylate, was then soaked overnight in an aqueous solution of 1 N sodium hydroxide, was then well water-washed to perfectly remove the homopolymer part of the acrylic acid, was further washed with methanol and ether and was then dried to obtain a product polymer. The amount of the reduction of the weight of the polymer by this series of operations was about 20% and an absorption apparently based on both acrylic acid and dimethylaminoethyl methacrylate was present as mixed in the infrared absorption spectrum of this polymer. It is therefore evident that it is not a mere polyblend, but is a copolymer. Its structure is presumed to be mostly amphoteric high molecular weight electrolytic, as mentioned in the above explanation, and is also judged, from its hard appearance, to be of a considerably high molecular weight.

Even when the polymerization time was made 24 hours and the atmosphere in the ampoule was carbon dioxide, the conversion (polymer yield) was about 100% and substantially the same was obtained. Further, when the polymer atmosphere in the ampoule was oxygen, the polymerization did not proceed at all. Even when the polymerizing atmosphere was nitrogen, if hydroquinone was added, the polymerization did not proceed at all.

Example 2

A polymerization was carried out in exactly the same manner as in Example 1 except that half as much of the monomers were used and 11.42 g. of benzene were added as a solvent. With the progress of the polymerization, a white powdery polymer was precipitated and the conversion (polymer yield) after 24 hours was 44.4%. This polymer substantially was soluble in methanol but it had a very slight insoluble part.

Example 3

A glass ampoule of a capacity of about 30 g. was kept at −78° C. 5.6 g. of sorbic acid and 7.8 g. of dimethylaminoethyl methacrylate were put into it, the atmosphere in the ampoule was replaced with nitrogen and then the ampoule was sealed. The ampoule was dipped in a thermostatic tank at 30° C. and a polymerization was conducted for 24 hours while lightly shaking the ampoule. Then the contents were poured into methanol which had dissolved therein 0.1 g. of hydroquinone to stop the polymerization. The remaining dimethylaminoethyl methacrylate was driven out at about 80° C. under a reduced pressure. Then the product was dissolved in benzene as much as possible and was then extracted with water. When water was driven out of the water extract, a viscous polymer was obtained. When the polymer was dried under a reduced pressure and was then weighed to calculate the conversion (polymer yield) it was about 65%. In these operations, the monomers and each homopolymer (if any) should have been removed. When the infrared absorption spectrum of the refined polymer was measured, there was present an absorption apparently based on both of the sorbic acid and dimethylaminoethyl methacrylate. It is thus evident that the obtained polymer is not a mere polyblend, but is a copolymer.

Examples 4 to 18

A polymerization was conducted for 24 hours in the same manner as in Example 1 except that an ampoule of a capacity of about 30 ml. was used and the kinds of the monomers were varied. The results were as listed in the following table.

| No. | Monomer having carboxyl group | Amount (in g.) | Monomer having amine group | Amount (in g.) | Conversion (in percent) | State of the polymer |
|---|---|---|---|---|---|---|
| 4 | Acrylic acid | 3.6 | Dimethylaminoethyl methacrylate | 7.8 | About 100 | Colorless, transparent and solid and swelled with methanol. |
| 5 | Methacrylic acid | 4.4 | do | 7.8 | 98 | Do. |
| 6 | Itaconic acid | 6.6 | do | 7.8 | 86 | Light brown, transparent and gelly and swelled with methanol. |
| 7 | Crotonic acid | 4.4 | do | 7.8 | 88 | Light brown, transparent, gelly and soluble in methanol. |
| 8 | Maleic anhydride | 5.0 | do | 7.8 | 62 | Blackish brown, tarry and soluble in methanol. |
| 9 | Acrylic acid | 3.6 | 1-vinyl-2-methyl-imidazole | 5.2 | 70 | Light brown, waxy and soluble in methanol. |
| 10 | Maleic anhydride | 5.0 | do | 5.2 | 66 | Blackish brown, tarry and soluble in methanol. |
| 11 | Acrylic acid | 3.6 | 2-vinylpyridine | 5.2 | 88 | Light brown, viscous and soluble in methanol. |
| 12 | Maleic anhydride | 5.0 | do | 5.2 | 64 | Blackish brown, tarry and soluble in methanol. |
| 13 | Acrylic acid | 3.6 | 4-vinylpyridine | 5.2 | 93 | Brown, resinousand soluble in methanol. |
| 14 | Methacrylic acid | 4.4 | do | 5.2 | 90 | Reddish brown, viscous and soluble in methanol. |
| 15 | Crotonic acid | 4.4 | do | 5.2 | 85 | Do. |
| 16 | Maleic acid | 5.8 | Dimethylaminoethyl methacrylate | 7.8 | 38 | Light brown, transparent and viscous. |
| 17 | Fumaric acid | 5.8 | do | 7.8 | 56 | Light brown, transparent and gelly. |
| 18 | Cinnamic acid | 7.4 | do | 7.8 | 32 | Light brown, transparent and viscous. |

Examples 19 to 22

A polymerization was conducted in exactly the same manner as in Example 4, except that the ratios of both monomers were varied. The results were as listed in the following table. The polymerization time was 5 hours.

| No. | Amount of acrylic acid (in g.) | Amount of dimethyl-aminoethyl methacrylate (in g.) | State of the polymer |
|---|---|---|---|
| 19 | 10.0 | 2.0 | Colorless, somewhat white turbid and viscous. |
| 20 | 6.0 | 6.0 | Colorless, somewhat white turbid and gelly. |
| 21 | 4.0 | 8.0 | Colorless, transparent and solid. |
| 22 | 2.0 | 10.0 | Colorless, somewhat white turbid and viscous. |

As is evident from this table, when both monomers were present in about equimolar amounts, the polymerization occurred most remarkably. That is in Example No. 21, both monomers were present in almost equimolar amounts.

Control.—When acrylamide, methylolacrylamide and N-vinylpyrrolidone were used instead of dimethylaminoethyl methacrylate in Example 4, no polymerization occurred at all.

Example 23

A polymerization was conducted for 2 hours in exactly the same manner as in Example 1 and the monomers were driven out under a reduced pressure to obtain 13.6 g. of a polymer soluble in methanol. The action of this polymer as a soil coagulation accelerating or conditioning agent was measured as follows.

That is to say, aqueous solutions of 0.5% by weight of this polymer and each of the various polymers listed in the following table were prepared, for comparison purposes. On the other hand, samples of water (of a total volume of 16 ml.) containing about 6 g. of a soil of the Kanto loam layer were put into graduated test tubes. 0.5 ml. of each of the above mentioned aqueous solutions of the polymers was added to the respective samples, the contents were well shaken and were then left standing and the settling state was measured. The original height was represented by $h_0$, the height of the boundary surface of the soil and water was represented by $h$ and the height of the boundary surface of the soil and water after the contents were left standing for a long time (more than 2 hours) was represented by $h_e$. The following three items were selected as characteristic values representing the settling state:

$h_0/h_e$: Settled volume ratio (the smaller this ratio, the larger the soil blocking or conditioning action).

$t½$: Time until $h/h_e = ½ (h_0/h_e)$ (the smaller this value, the quicker the settling).

$t_c$: Time until the boundary surface of the soil and water became clear (the shorter this time, the more complete the settling).

The results are shown in the following table. It is evident that the polymers of the present invention are small in $h_0/h_e$, $t ½$ and $t_c$ over a wide pH range and are remarkable in both of the accelerating effect in soil blocking and soil coagulating and soil settling action.

| No. | Kind of polymer | pH | $h_0/h_e$ | $t½$ (min.) | $t_c$ (min.) | Remarks |
|---|---|---|---|---|---|---|
| A | Present invention | 4.8 | 4.21 | 2.1 | <0.5 | |
| B | do | 1.6 | 4.35 | 2.0 | <0.5 | |
| C | do | 9.5 | 4.18 | 2.1 | <0.5 | |
| D | Polyvinyl alcohol (perfectly saponified) | 5.0 | 4.96 | 4.2 | 5 | Many bubbles |
| E | Polyvinyl alcohol (partially saponified) | 5.6 | 4.85 | 4.8 | 4 | Do. |
| F | Methylcellulose | 5.4 | 4.20 | 5.4 | 5 | Do. |
| G | Carboxymethylcellulose | 6.2 | 4.15 | 2.6 | >60 | |
| H | Polyacrylic acid | 2.6 | 4.06 | 5.0 | <0.5 | |
| I | Sodium polyacrylate | 8.2 | 4.25 | 2.1 | <0.5 | |
| J | None | | 7.36 | 4.6 | 25 | |

The embodiments of the invention in which an exclusive property or privilege is claimed are defined as follows:

1. A method which comprises polymerizing by contacting and mixing with each other, in the absence of any polymerization initiator and in an inert atmosphere, a monomer selected from the group consisting of polymerizable α,β-unsaturated aliphatic monobasic and dibasic acids and an unsaturated monomer having a tertiary amine group which can become a quaternary ammonium salt and selected from the group consisting of 2-vinylpyridine, 4-vinylpyridine, 2-methyl-5-vinylpyridine, dimethylaminomethyl methacrylate, dimethylaminoethyl methacrylate and 1-vinyl-2 methylimidazole.

2. A method according to claim 1, in which the mol ratio of the acid monomer to the monomer having amine group is between 0.5:1 to 1.5:1.

3. A method according to claim 1, in which the mol ratio of the acid monomer to the monomer having amine group is between 0.8:1 and 1.2:1.

4. A method according to claim 1, in which the mol ratio of the acid monomer to the monomer having amine group is about 1:1.

5. A method according to claim 2, in which the acid monomer is selected from the group consisting of acrylic acid, methacrylic acid, crotonic acid, itaconic acid, maleic acid, fumaric acid, maleic anhydride, cinnamic acid and sorbic acid.

6. A method according to claim 1, in which the polymerization reaction is carried out for between about 1 to 10 hours.

7. A method according to claim 1, in which the polymerization reaction is carried out at a temperature between about 0 to 150° C.

8. A method according to claim 1, in which the polymerization reaction is carried out at a temperature between about 20 to 80° C.

9. A method according to claim 2, in which the acid monomer is selected from the group consisting of acrylic acid and methacrylic acid and the monomer having amine group is selected from the group consisting of dimethylaminomethyl methacrylate and dimethylaminoethyl methacrylate.

References Cited

UNITED STATES PATENTS 3,382,214   5/1968   Haas _____ 260—67.5

JOSEPH L. SCHOFER, Primary Examiner

J. KIGHT III, Assistant Examiner

U.S. Cl. X.R.

260—80.3 N